United States Patent
Hatem et al.

(10) Patent No.: US 10,635,670 B2
(45) Date of Patent: *Apr. 28, 2020

(54) INTEGRATION OF QUERY PROCESSING ENGINES IN A DISTRIBUTED DATABASE SYSTEM

(71) Applicant: SAP SE, Walldorf OT (DE)

(72) Inventors: Youssef Hatem, Wiesloch (DE); Stephan Kessler, Linkenheim-Hochstetten (DE); Axel Christ, Walldorf (DE); Christian Mathis, Walldorf (DE)

(73) Assignee: SAP SE, Walldorf (DE)

( * ) Notice: Subject to any disclaimer, the term of this patent is extended or adjusted under 35 U.S.C. 154(b) by 293 days.

This patent is subject to a terminal disclaimer.

(21) Appl. No.: 15/275,040

(22) Filed: Sep. 23, 2016

(65) Prior Publication Data
US 2018/0089267 A1    Mar. 29, 2018

(51) Int. Cl.
*G06F 16/2453*    (2019.01)
*G06F 16/2455*    (2019.01)
(Continued)

(52) U.S. Cl.
CPC .... *G06F 16/24542* (2019.01); *G06F 16/2455* (2019.01); *G06F 16/2471* (2019.01); *G06F 16/9535* (2019.01)

(58) Field of Classification Search
CPC ......... G06F 17/30433; G06F 17/30474; G06F 16/24542; G06F 16/2471; G06F 16/2455; G06F 16/9535
(Continued)

(56) References Cited

U.S. PATENT DOCUMENTS

RE46,776 E   *   4/2018   Petrovykh ............... H04L 41/18
2003/0182261 A1*  9/2003  Patterson ............ H04L 67/1036
(Continued)

OTHER PUBLICATIONS

"Spark SQL, DataFrames and Datasets Guide." Spark SQL and DataFrames—Spark 2.1.0 Documentation. N.p., n.d. Web. Jan. 31, 2017. <https://spark.apache.org/docs/latest/sql-programming-guide.html>.
(Continued)

*Primary Examiner* — Matthew J Ellis
(74) *Attorney, Agent, or Firm* — Mintz Levin Cohn Ferris Glovsky and Popeo, P.C.

(57) ABSTRACT

In one respect, there is provided a distributed database system. The distributed database system can include a plurality of hosts configured to store and/or manage data, a first query processing engine comprising a master node and an executor node, and a second query processing engine. The master node can be implemented on one or more programmable processors and configured to perform operations. The operations can include: generating an execution plan for a query on data that is stored at and/or managed by one or more of the plurality of hosts; determining to push down, to the second query processing engine, at least one data processing operations in the execution plan; and dispatching, to the executor node, at least a portion of the execution plan, the portion of the execution plan including the at least one data processing operation that is pushed down to the second query processing engine.

15 Claims, 5 Drawing Sheets

(51) Int. Cl.
　　　　*G06F 16/2458*　　(2019.01)
　　　　*G06F 16/9535*　　(2019.01)
(58) Field of Classification Search
　　　　USPC .......................................... 707/718; 719/318
　　　　See application file for complete search history.

(56) References Cited

U.S. PATENT DOCUMENTS

| | | | |
|---|---|---|---|
| 2009/0070786 A1* | 3/2009 | Alves | G06F 9/541 |
| | | | 719/318 |
| 2011/0302151 A1* | 12/2011 | Abadi | G06F 16/2456 |
| | | | 707/714 |
| 2012/0005190 A1* | 1/2012 | Faerber | G06F 17/30404 |
| | | | 707/718 |
| 2014/0244701 A1* | 8/2014 | Welton | H04L 67/1097 |
| | | | 707/827 |
| 2016/0306849 A1* | 10/2016 | Curino | G06F 16/24542 |
| 2018/0011905 A1* | 1/2018 | Liu | G06F 16/24554 |

OTHER PUBLICATIONS

Armbrust, Michael, et al. "Spark sql: Relational data processing in spark." Proceedings of the 2015 ACM SIGMOD International Conference on Management of Data. ACM, 2015.
Borthakur, Dhruba. "HDFS architecture guide." Hadoop Apache Project 53 (2008).
Zaharia, Matei, et al. Resilient distributed datasets: A fault-tolerant abstraction for in-memory cluster computing. Technical Report UCB/EECS-2011-82, EECS Department, University of California, Berkeley, 2011.

* cited by examiner

US 10,635,670 B2

INTEGRATION OF QUERY PROCESSING ENGINES IN A DISTRIBUTED DATABASE SYSTEM

FIELD

The present disclosure generally relates to database processing and, more specifically, to the integration of multiple query processing engines in a distributed database system.

BACKGROUND

Data in a distributed database system is stored across a multitude of physically and/or logically distinct hosts. For example, data in a distributed database system may be stored on different host computers. Alternately or additionally, data in a distributed database system may be managed by separate host processes. To fulfill a query in a distributed database system, a query processing engine may generate an execution plan setting forth the data processing operations (e.g., join, aggregation, filter, relation) required by the query. The query processing engine may further distribute portions of the execution plan to the appropriate hosts, thereby delegating the data processing operations to the hosts storing and/or managing the relevant data.

SUMMARY

Methods, systems, and articles of manufacture, including computer program products, are provided for query processing in a distributed database system. In some implementations of the current subject matter, there is provided a distributed database system. The distributed database system can include a plurality of hosts configured to store and/or manage data. The distributed database system can further include a first query processing engine and a second query processing engine. The first query processing engine can include a master node and an executor node. The master node of the first query processing engine can be implemented on one or more programmable processor and configured to perform operations. The operations can include: generating an execution plan for a query on data that is stored at and/or managed by one or more of the plurality of hosts; determining to push down, to the second query processing engine, at least one data processing operation in the execution plan; and dispatching, to the executor node, at least a portion of the execution plan, the portion of the execution plan including the at least one data processing operation that is pushed down to the second query processing engine.

In some variations, one or more of the features disclosed herein including the following features can optionally be included in any feasible combination. Pushing down the at least one data processing operation can include rewriting the at least one data processing operation in structured query language (SQL). The executor node can be deployed at a same host as an instance of the second query processing engine. The executor node can be configured to forward, to the instance of the second query processing engine, the at least one data processing operation that is pushed down to the second query processing engine. The sending can be performed via an application programming interface (API).

In some variations, the master node can determine to push down the at least one data processing operation, when the at least one data processing operation requires data residing at the second query processing engine. Alternatively or additionally, the master node can determine to push down the at least one data processing operation, when the at least one data processing operation does not require data stored at and/or managed by other hosts that are not associated with the executor node and a corresponding instance of the second query processing engine. The master node can further determine to push down the at least one data processing operation, when the second query processing engine supports the at least one data processing operation. The master node can determine to push down the at least one data processing operation, when the at least one data processing operation comprises a data processing operation on a result of one or more other data processing operations on data residing at the second query processing engine.

In some variations, the first query processing engine can be a distributed query processing engine, and wherein the second query processing engine can be a distributed query processing engine or a non-distributed query processing engine.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
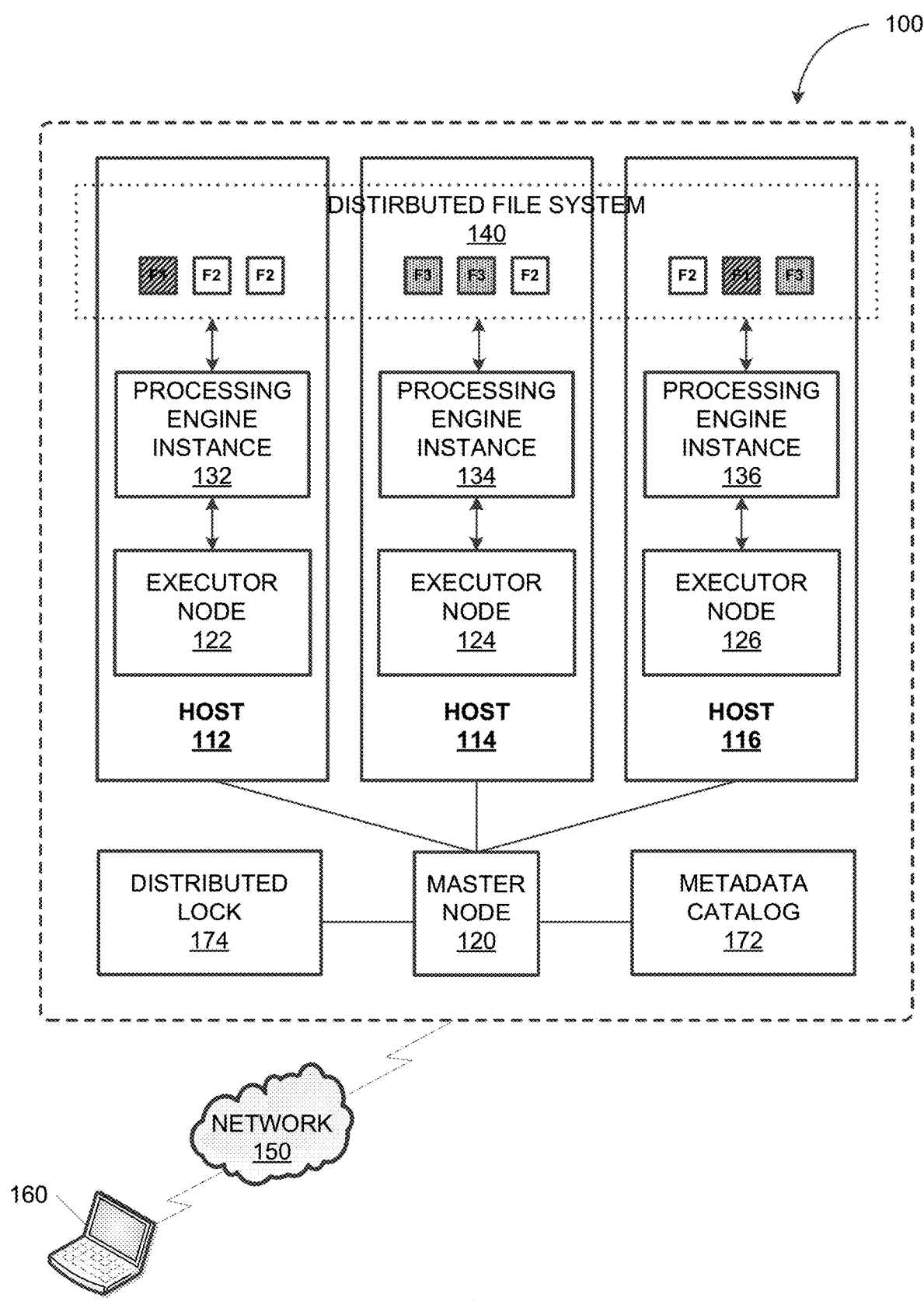
FIG. 1 depicts a block diagram illustrating a distributed database system consistent with implementations of the current subject matter.

Like labels are used to refer to same or similar items in the drawings.

DETAILED DESCRIPTION

A distributed database system can include a distributed query processing engine adapted to handle queries on data that is stored at and/or managed by a plurality of different hosts in the distributed database system. For example, the distributed database system can include an Apache Spark™ (available from Apache Software Foundation of Forest Hill, Md.) cluster computer framework, which can be configured to respond to a query on data stored in the distributed database system. A master node of the distributed query processing engine can generate an execution plan for the query and dispatch portions of the execution plan to various executor nodes, which are deployed at each host in the distributed database system. Although the distributed query processing engine can generate and dispatch the execution plan in an efficient manner, an individual executor node may be less efficient when executing the data processing operations that are delegated to that executor node.

In some implementations of the current subject matter, a distributed database system may include an integrated query processing engine. The integrated query processing engine may include a first query processing engine and a second query processing engine. The first query processing engine may be a distributed query processing engine such as Apache Spark™ and/or the like. Meanwhile, the second query processing engine may be a distributed or non-distributed query processing engine such as the HANA Vora™ query processing engine (available from SAP SE of Walldorf, Germany). According to some implementations of the current subject matter, the second query processing engine may be more efficient (e.g., faster, lower memory requirement) than the first query processing engine at executing data processing operations that are dispatched and delegated to the individual hosts in the distributed database system. As such, the distributed query processing engine can be configured to selectively push down certain data processing operations from the first query processing engine to the second query processing engine such that the second query processing engine can execute these data processing operations instead of the first query processing engine.

FIG. 1 depicts a block diagram illustrating a distributed database system 100 consistent with implementations of the current subject matter. Referring to FIG. 1, the distributed database system 100 may include a plurality of hosts including, for example, a first host 112, a second host 114, and a third host 116. The distributed database system 100 may further include a distributed file system 140 (e.g., a Hadoop distributed file system (HDFS)).

As shown in FIG. 1, data in the distributed file system 140 may be stored at and/or managed by the first host 112, the second host 114, and the third host 116. As such, portions of a single file may be stored at and/or managed by multiple hosts. For instance, portions of a first file F1 may be stored at and/or managed by the first host 112 and the third host 116. Meanwhile, portions of a second file F2 may be stored at and/or managed by the first host 112 and the second host 114. Portions of a third file F3 may be stored at and/or managed by the second host 114 and the third host 116. Although the distributed database system 100 is shown to include three hosts, it should be appreciated that the distributed database system 100 may include a different number of hosts without departing from the scope of the present disclosure.

In some implementations of the current subject matter, the distributed database system 100 can further include an integrated query processing engine that includes a first query processing engine and a second query processing engine. The first query processing engine may be a distributed query processing engine (e.g., Spark) that includes a master node 120 and a plurality of executor nodes that are deployed at each host in the distributed database system 100. For instance, as shown in FIG. 1, the first query processing engine can include a first executor node 122, a second executor node 125, and a third executor node 126. The first executor node 122 can be deployed at the first host 112, the second executor node 124 can be deployed at the second host 114, and the third executor node 126 can be deployed at the third host 116. The first executor node 122, the second executor node 124, and the third executor node 126 can be communicatively coupled with the master node 120. For example, the master node 120 may delegate data processing operations by dispatching portions of an execution plan to the first executor node 122, the second executor node 124, and/or the third executor node 126. It should be appreciated that the first query processing engine may include a different number of executor nodes without departing from the scope of the present disclosure.

Data in the distributed database system 100 (e.g., the first file F1, the second file F2, and/or the third file F3) can be queried via the integrated query processing engine. A user device 160 can submit a query via a wired and/or wireless network 150 (e.g., a wide area network (WAN), a local area network (LAN), and/or the Internet). The master node 120 of the first query processing engine can respond to the query by generating an execution plan that sets forth the data processing operations required to by the query. For example, the user device 160 may submit the following SQL query:

SELECT city, AVG(age) FROM Attendees WHERE city='Walldorf' GROUP BY city

Figure 2:
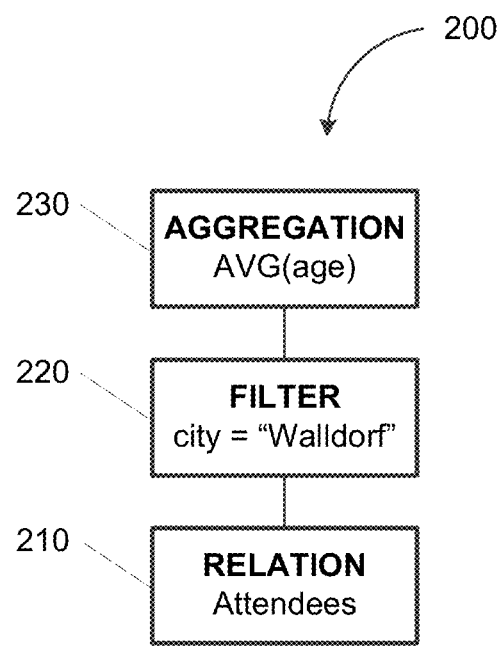
FIG. 2 depicts an example of an execution plan consistent with implementations of the current subject matter.

FIG. 2 depicts an example of an execution plan 200 consistent with implementations of the current subject matter. The master node 120 may respond to the above query by generating the execution plan 200. As shown in FIG. 2, the execution plan 200 can have a tree structure with nodes that correspond to individual data processing operations. The tree structure corresponding to the execution plan 200 can have a first node 210, a second node 220, and a third node 230. Executing a query may include traversing the tree structure of the corresponding execution plan and performing the data processing operation at each node in an order indicated by the tree structure. Thus, to execute this example query, the execution plan 200 may be traversed by first loading the relation Attendees, as indicated by the first node 210. Next, a filter may be applied for the city of Walldorf, as indicated by the second node 220. Finally, the result of the filter operation may be aggregated based on age, as indicated by the third node 230. The master node 120 may generate the execution plan 200 and dispatch portions of the execution plan 200 to the first host 122, the second host 124, and/or the third host 126.

In some implementations of the current subject matter, the second query processing engine can be a distributed or a non-distributed query processing engine (e.g., Vora). The distributed database system 100 can include a plurality of instances of the second query processing engine including, for example, a first processing engine instance 132, a second processing engine instance 134, and a third processing engine instance 136. As shown in FIG. 1, the first processing engine instance 132 can be deployed at the first host 112, the second processing engine instance 134 can be deployed at the second host 114, and the third processing engine instance 136 can be deployed at the third host 116.

According to some implementations of the current subject matter, the first query processing engine and the second query processing engine can be integrated such that at least some of the data processing operations delegated to an executor node of the first query processing engine are pushed down to be performed by an instance of the second query processing engine instead. For example, a portion of the execution plan 200 may be dispatched to the first host 112. The portion of the execution plan 200 may include one or more data processing operations to be performed at the first host 112. The first query processing engine (e.g., the first executor node 122) may be capable of performing the one or more data processing operations. However, the second query processing engine (e.g., the first processing engine instance 132) may be able to perform at least some of the data processing operations more efficiently. Thus, the master node 120 can determine whether at least some of the data processing operations should be pushed down to be performed by the first processing engine instance 132 instead of by the first executor node 122. The master node 120 can determine to push down a data processing operation based on one or more criteria including, for example, the query, the distribution of the data required by the data processing operation, and the capabilities of the first and/or second query processing engines. Pushing down a data processing operation may include rewriting the data processing operation in SQL prior to dispatching the corresponding portion of the execution plan to the executor node at the appropriate host.

In some implementations of the current subject matter, the distributed database system 100 may further include a metadata catalog 172. The first query processing engine and/or the second query processing engine may be configured to maintain data loaded from the distributed file system 140 in memory for as long as possible in order to expedite subsequent queries on the same data. Thus, the metadata catalog 172 may track the locations (e.g., the executor nodes of the first query processing engine and/or the instances of the second query processing engine) that have been loaded with data from the distributed file system 140. According to some implementations of the current subject matter, data processing operations may be pushed down to an instance of the second query processing engine if the data required by the data processing operation is already loaded onto that instance of the second query processing engine.

As shown in FIG. 1, the distributed database system 100 can include a distributed lock 174 adapted to provide state synchronization. The distributed lock 174 can be obtained exactly prior to executing a query in order to serialize parallel query executions. Obtaining the distributed lock 174 may be required when the query modifies in-memory data. For example, the query may include a DROP, CREATE, and/or LOAD statement that alters data that is loaded onto the first query processing engine and/or the second query processing engine.

In some implementations of the current subject matter, the distributed lock 174 can be allocated based on the data affected by a query. For instance, the query can be analyzed to determine that the query operates on a first table T1 and a second table T1. The distributed lock 174 may be obtained for the first table T1 by writing T1 to a key-value store. According to some implementations of the current subject matter, the key-value store may be a data structure (e.g., Redis, ZooKeeper, Consul) that supports simultaneous access. If the key-value store does not already contain an entry for T1, then the distributed lock 174 can be successfully obtained for executing the query with respect to the first table T1. The entry T1 can be removed from the key-value store upon completion of the query. By contrast, if the entry T1 already exists in the key-value store, then the distributed lock 174 is already in use (e.g., for another query). As such, the execution the query can be delayed until the entry T1 is removed from the key-value store when the distributed lock 174 is released.

When the distributed lock 174 is successfully obtained for the first table T1, the distributed lock 174 for the second table T2 can be obtained in a same or similar manner as the distributed lock for the first table T1. But if the distributed lock 174 cannot be obtained for the second table T2, the distributed lock 174 for the first table T1 is required to be released. Moreover, the names of tables are sorted in the key-value store prior to locking multiple tables (e.g., both the first table T1 and the second table T2) in order to avoid dead-lock scenarios where the distributed lock 174 for multiple tables are held separately.

Although the integrated query processing engine is shown to include two query processing engines, it should be appreciated that the integrated query processing engine may include additional distributed and/or non-distributed query processing engines without departing from the scope of the present disclosure.

Figure 3:
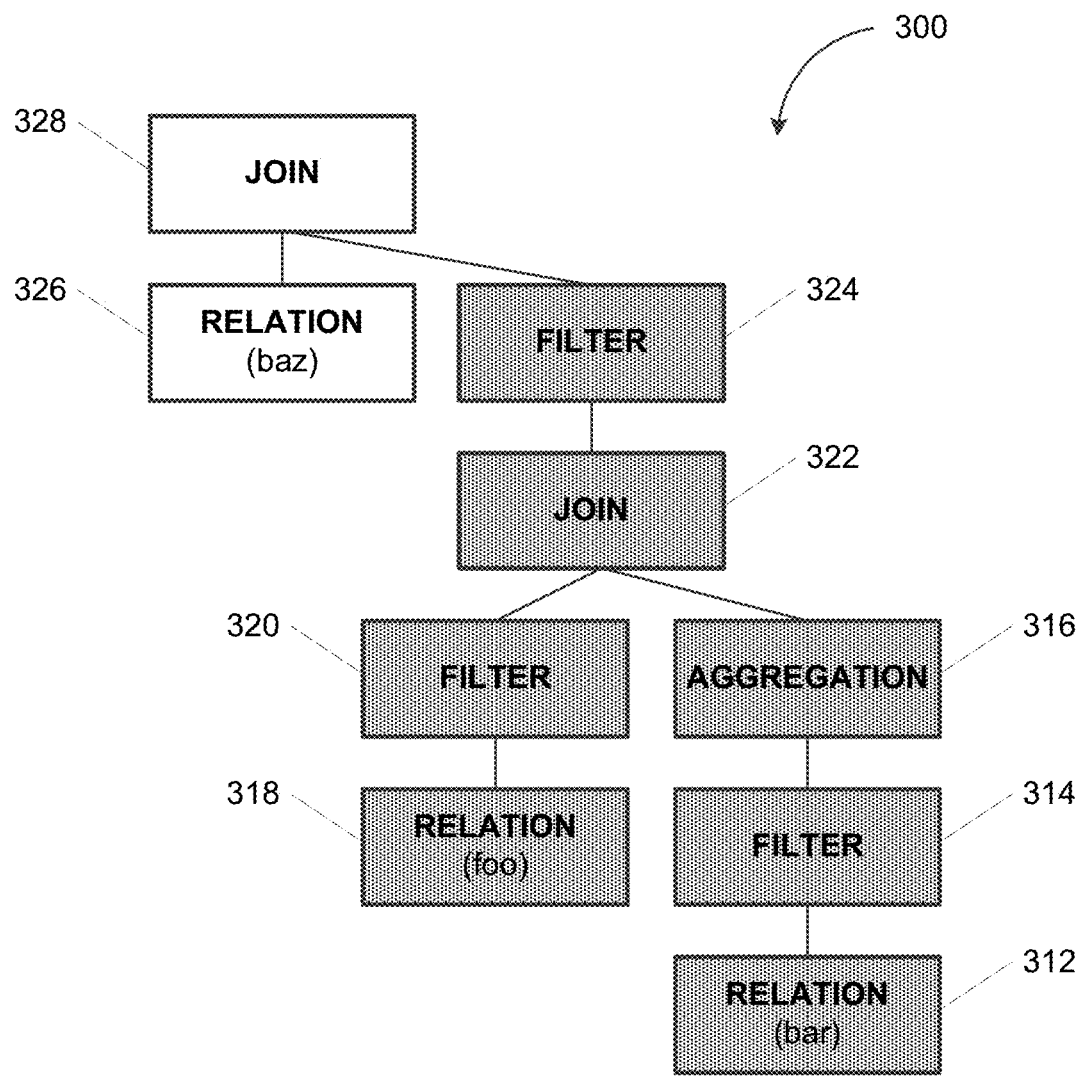
FIG. 3 depicts an example of an execution plan consistent with implementations of the current subject matter.

FIG. 3 depicts an example of an execution plan 300 consistent with implementations of the current subject matter. Referring to FIGS. 1 and 3, the execution plan 300 may include a plurality of data processing operations that may be performed by the first query processing engine and/or the second query processing engine. Executing the query associated with the execution plan 300 may include traversing the execution plan 300 and executing each of the data processing operations from the bottom up. As shown in FIG. 3, the execution plan 300 can have a tree structure having nodes that correspond to each of the data process operations required by the execution plan 300.

According to some implementations of the current subject matter, the first query processing engine may determine whether to push down a data processing operation to the second query processing engine based on one or more criteria. For example, the first query processing engine may determine to push down a data processing operation to the second query processing engine based on whether the second query processing engine supports the data processing operation. Alternately or additionally, the first query processing engine may determine to push down a data processing operation to the second query processing engine based on the distribution of data. For instance, the first query processing engine may determine to push down the data processing operation if the data processing operation requires data that is stored on and/or managed by a single host, and/or data that is already loaded onto one or more instances of the second query processing engine. Pushing down a data processing operation may include rewriting the data processing operation in SQL and sending the data processing operation to the second query processing engine via an API such as a Java Database Connectivity (JDBC) driver and/or the like.

Referring again to FIG. 3, a first node 312 of the tree structure corresponding to the execution plan 300 indicates that the first data query operation is to load the relation (bar). The first query processing engine may determine to push this data processing operation down to the second query processing engine if information from the metadata catalog 172 indicates that the relation (bar) resides in one or more instances of the second query processing engine. For instance, the relation (bar) may be created in the second query processing engine and/or has been loaded onto the second query processing engine. Thus, the loading of the relation (bar) may be pushed down to the second query processing engine if the relation (bar) resides at the first processing engine instance 132, the second processing engine instance 134, and/or the third processing engine instance 136. Similarly, the first query processing engine may also determine to push the data processing operations to filter and aggregate on the relation (bar), indicated respectively by a second node 312 and a third node 314. This is because the filter operation and the aggregate operation are being performed on data that already resides in one or more instances of the second query processing engine.

Meanwhile, the first data query processing engine may determine to push down the loading of the relation (foo) as indicated by a fourth node 318, if the relation (foo) already resides in one or more instances of the second query processing engine (e.g., the first processing engine instance 132, the second processing engine instance 134, and/or the third processing engine instance 136). The first data query processing engine may further determine to push down the data processing operation indicated by a fifth node 320 of the tree structure corresponding to the execution plan 300. Thus, the operation to filter the relation (foo) may be pushed down since that data processing operation is being performed on data already residing in the second query processing engine.

The first data query processing engine may determine to push down the data processing operation to join the results of the filter and aggregation operation (e.g., as indicated by a sixth node 322) since the results of these data processing operations reside in the second query processing engine. Similarly, the first data query processing engine may determine to push down the data processing operation to filter the result of this join operation, as indicated by a seventh node 324. However, information from the metadata catalog 172 may indicate that the relation (baz) resides in the first query processing engine. As such, the first query processing engine may determine to not push down the operation to load the relation (baz), which is indicated by an eighth node 326. Furthermore, the first query processing engine may determine to not push down the operation to join the relation (baz) and the results of the filter operation (e.g., as indicated by a ninth node 328) since the operations require data that resides in the first query processing engine and the second query processing engine.

Figure 4:
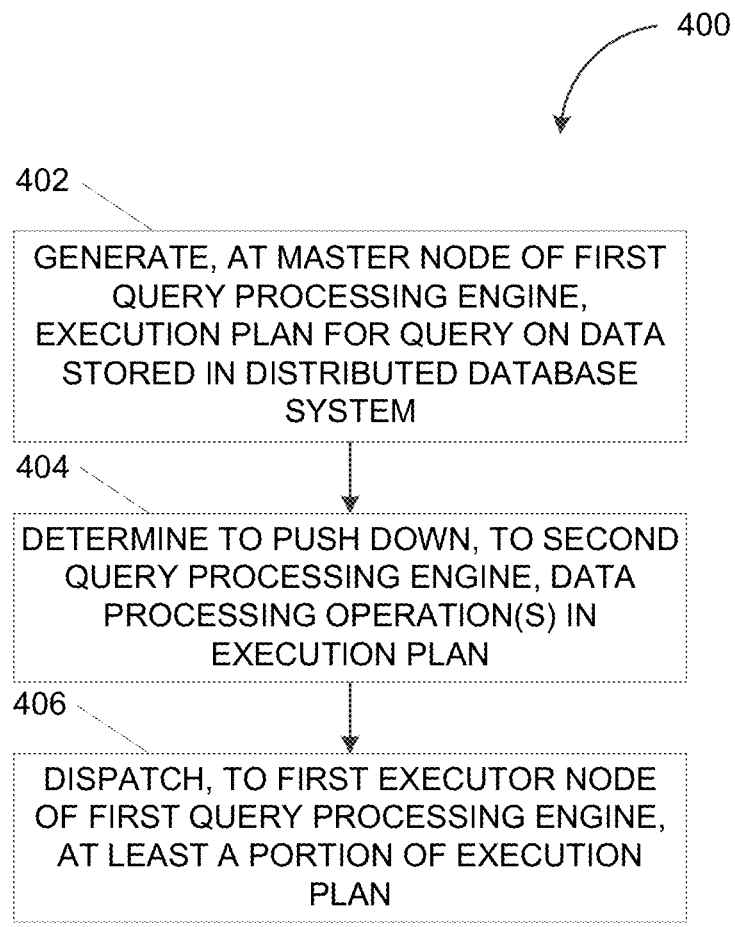
FIG. 4 depicts a flowchart illustrating a process for executing a query consistent with implementations of the current subject matter.

FIG. 4 depicts a flowchart illustrating a process 400 for executing a query consistent with implementations of the current subject matter. Referring to FIGS. 1 and 4, the process 400 may be performed by the distributed database system 100. For instance, the process 400 may be performed by the master node 120 of the first query processing engine of the integrated query processing engine.

The master node 120 of the first query processing engine can generate an execution plan for a query on data that is stored in the distributed database system 100 (402). For example, the master node 120 can receive, from the user 160, a query for data that is stored in the distributed database system 100. As such, the query may require data that is stored at and/or managed by the first host 112, the second host 114, and/or the third host 116. The master node 120 may respond to the query by generating an execution plan (e.g., the execution plan 200, the execution plan 300).

The master node 120 can determine to push down, to the second query processing engine, one or more data processing operations in the execution plan (404). For instance, the master node 120 can determine to push down one or more data processing operations to the second query processing engine based on one or more criteria including, for example, the query itself, the distribution of the data required by the data processing operations, and the capabilities of the first query processing engine and the second query processing engine. In some implementations of the current subject matter, the master node 120 may determine to push down one or more data processing operations based on information from the metadata catalog 172 indicating a location of the data required by the query. The master node 120 may push down the one or more data processing operations by rewriting the corresponding portion of the execution plan back to SQL.

The master node 120 can dispatch, to the first executor node 122 of the first query processing engine, at least a portion of the execution plan (406). For example, the master node 120 can dispatch portions of the execution plan to the executor node (e.g., the first executor node 122, the second executor node 124, the third executor node 126) that is deployed at the appropriate hosts (e.g., the first host 112, the second host 114, the third host 116). The executor nodes may perform one or more data processing operations from the execution plan that are not pushed down to the second query processing engine. Meanwhile, the data processing operations that are pushed down to the second query processing engine may be forwarded by the executor node (e.g., via a JDBC driver) for execution by the appropriate instance of the second query processing engine (e.g., the first processing engine instance 132, the second processing engine instance 134, the third processing engine instance 136).

Figure 5:
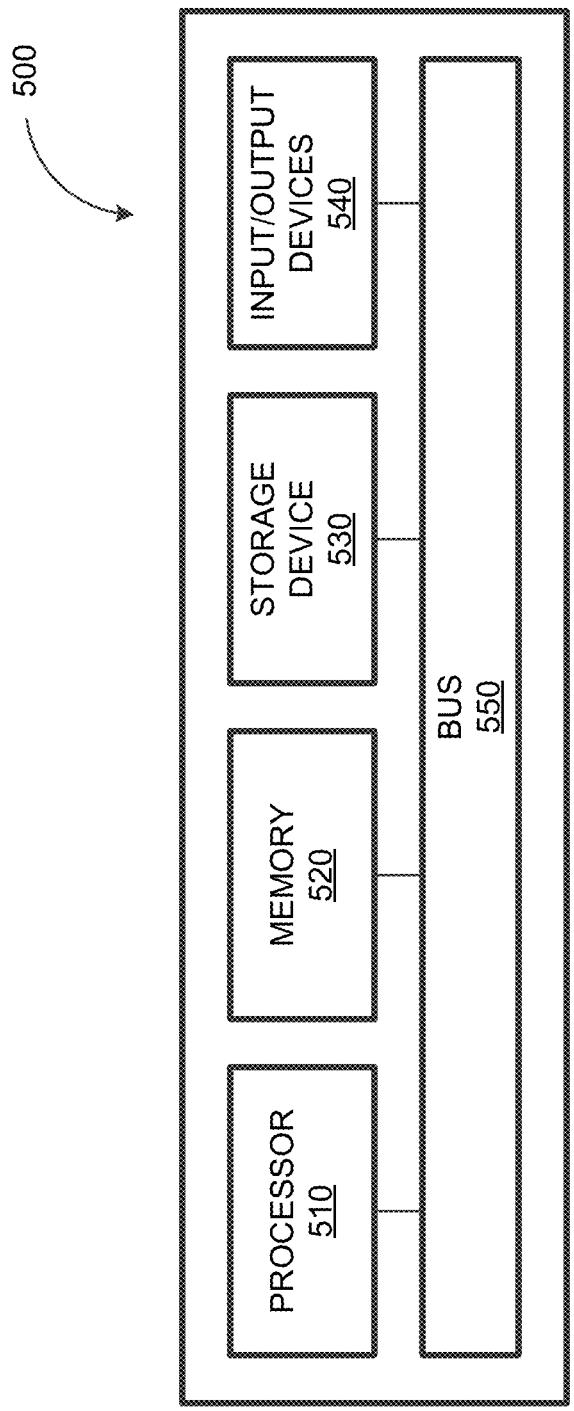
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the distributed database system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the distributed database system 100. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A distributed database system, comprising:
    a first query processing engine comprising a master node and a plurality of executor nodes;
    a second query processing engine comprising a plurality of instances of the second query processing engine; and
    a plurality of hosts storing data, each of the plurality of hosts including one of the plurality of executor nodes and one of the plurality of instances of the second query processing engine; and
    wherein the master node of the first query processing engine is implemented on one or more programmable processors and configured to perform operations comprising:
        generating an execution plan for a query on data that is stored at a host from the plurality of hosts, the execution plan including a first data processing operation and a second data processing operation;
        determining to push down, to the second query processing engine, the second data processing operation such that the second data processing operation is performed by an instance of the second query processing engine deployed at the host instead of an executor node of the first query processing engine deployed at the host, the master node determining to push down the second data processing operation based at least on the second data processing operation not requiring data stored at any other one of the plurality of hosts, and the master node determining not to push down the first data processing operation based at least on the first data processing operation requiring data stored at another one of the plurality of hosts; and
        dispatching, to the executor node, at least a portion of the execution plan, the portion of the execution plan including the first data processing operation such that the first data processing operation is performed by the executor node of the first query processing engine deployed at the host, and the portion of the execution plan further including the second data processing operation such that the second data processing operation is forwarded, by the executor node, to the instance of the second query processing engine deployed at the host to be performed by the instance of the second query processing engine deployed at the host.

2. The distributed database system of claim 1, wherein pushing down the second data processing operation includes rewriting the second data processing operation in structured query language (SQL).

3. The distributed database system of claim 1, wherein the second data processing operation is forwarded to the instance of the second query processing engine deployed at the host via an application programming interface (API).

4. The distributed database system of claim 1, wherein the master node determines to push down the second data processing operation based at least on the second data processing operation requiring data residing at the second query processing engine.

5. The distributed database system of claim 1, wherein the master node determines to push down the second data processing operation based at least on the second query processing engine supporting the second data processing operation.

6. The distributed database system of claim 1, wherein the master node determines to push down the second data processing operation based at least on the second data processing operation operating on a result of one or more other data processing operations on data residing at the second query processing engine.

7. The distributed database system of claim 1, wherein the first query processing engine comprises a distributed query processing engine, and wherein the second query processing engine comprises a distributed query processing engine or a non-distributed query processing engine.

8. A computer-implemented method, comprising:
generating, at a master node of a first query processing engine, an execution plan for a query on data that is stored at a host from a plurality of hosts in a distributed database system, the execution plan including a first data processing operation and a second data processing operation, the distributed database system including the first query processing engine and a second query processing engine, the first query processing engine comprising the master node and a plurality of executor nodes, the second query processing engine comprising a plurality of instances of the second query processing engine, and each of the plurality of hosts including one of the plurality of executor nodes and one of the plurality of instances of the second query processing engine;
determining to push down, to the second query processing engine, the second data processing operation such that the second data processing operation is performed by an instance of the second query processing engine deployed at the host instead of an executor node of the first query processing engine deployed at the host, the master node determining to push down the second data processing operation based at least on the second data processing operation not requiring data stored at any other one of the plurality of hosts, and the master node determining not to push down the first data processing operation based at least on the first data processing operation requiring data stored at another one of the plurality of hosts; and
dispatching, to the executor node, at least a portion of the execution plan, the portion of the execution plan including the first data processing operation such that the first data processing operation is performed by the executor node of the first query processing engine deployed at the host, and the portion of the execution plan further including the second data processing operation such that the second data processing operation is forwarded, by the executor node, to the instance of the second query processing engine deployed at the host to be performed by the instance of the second query processing engine deployed at the host.

9. The method of claim 8, wherein pushing down the second data processing operation includes rewriting the second data processing operation in structured query language (SQL).

10. The method of claim 8, wherein the second data processing operation is forwarded to the instance of the second query processing engine deployed at the host via an application programming interface (API).

11. The method of claim 8, wherein the second data processing operation is determined to be pushed down to the second query processing engine based at least on the second data processing operation requiring data residing at the second query processing engine.

12. The method of claim 8, wherein the second data processing operation is determined to be pushed down to the second query processing engine based at least on the second data processing operation operating on a result of one or more other data processing operations on data residing at the second query processing engine.

13. The method of claim 8, wherein the first query processing engine comprises a distributed query processing engine, and wherein the second query processing engine comprises a distributed query processing engine or a non-distributed query processing engine.

14. A computer program product comprising a non-transitory machine-readable medium storing instructions that, when executed by at least one programmable processor, cause the at least one programmable processor to perform operations comprising:
generating, at a master node of a first query processing engine, an execution plan for a query on data that is stored at a host from a plurality of hosts in a distributed database system, the execution plan including a first data processing operation and a second data processing operation, the distributed database system including the first query processing engine and a second query processing engine, the first query processing engine comprising the master node and a plurality of executor nodes, the second query processing engine comprising a plurality of instances of the second query processing engine, and each of the plurality of hosts including one of the plurality of executor nodes and one of the plurality of instances of the second query processing engine;
determining to push down, to the second query processing engine, the second data processing operation such that the second data processing operation is performed by an instance of the second query processing engine deployed at the host instead of an executor node of the first query processing engine deployed at the host, the master node determining to push down the second data processing operation based at least on the second data processing operation not requiring data stored at any other one of the plurality of hosts, and the master node determining not to push down the first data processing operation based at least on the first data processing operation requiring data stored at another one of the plurality of hosts; and dispatching, to the executor node, at least a portion of the execution plan, the portion of the execution plan including the first data processing operation such that the first data processing operation is performed by the executor node of the first query processing engine deployed at the host, and the portion of the execution plan further including the second data processing operation such that the second data processing operation is forwarded, by the executor node, to the instance of the second query processing engine deployed at the host to be performed by the instance of the second query processing engine deployed at the host.

15. The method of claim 8, wherein the master node determines to push down the second data processing operation based at least on the second query processing engine supporting the second data processing operation.

* * * * *